March 15, 1938. C. H. KEELER 2,111,187
OPHTHALMOSCOPE
Filed May 22, 1935
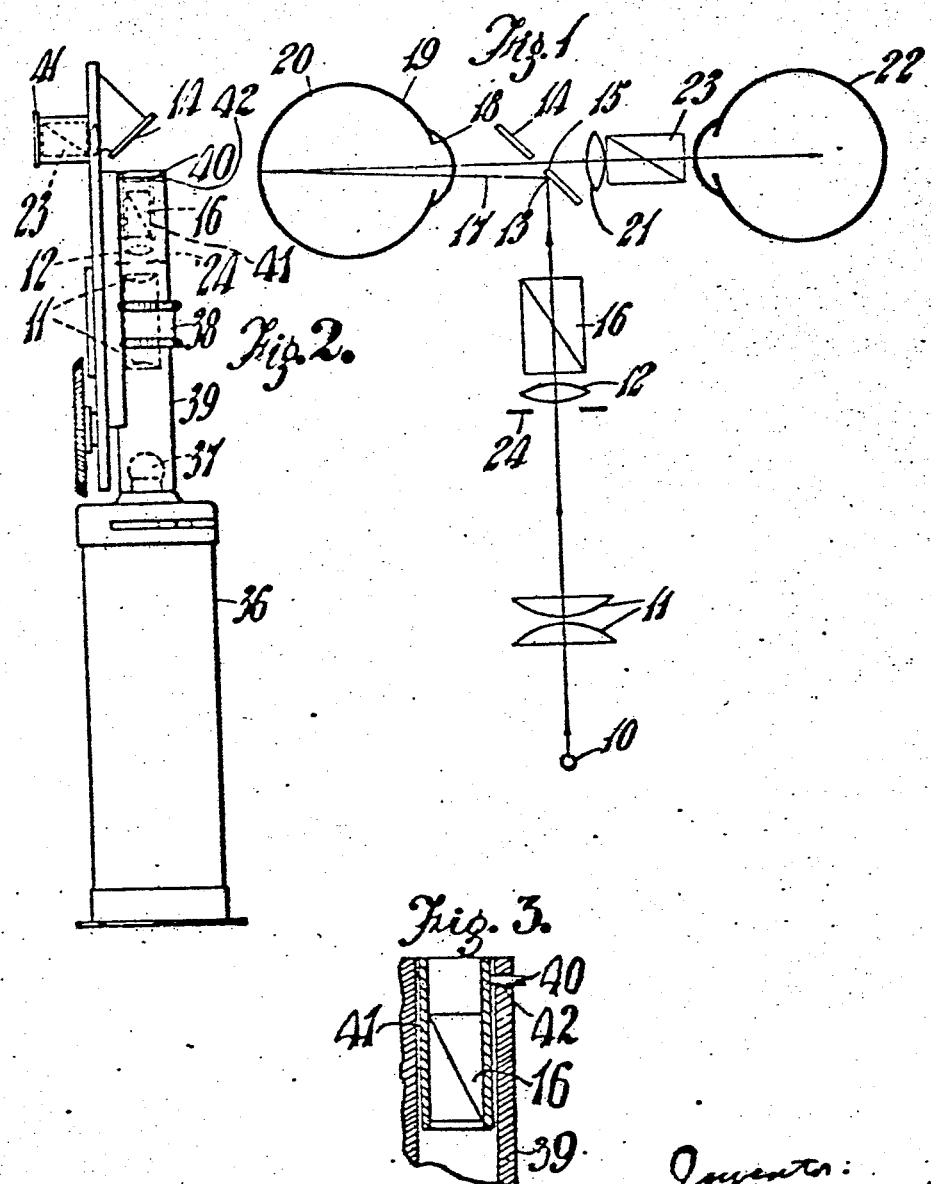

Patented Mar. 15, 1938

2,111,187

UNITED STATES PATENT OFFICE 2,111,187

OPHTHALMOSCOPE

Charles Henry Keeler, London, England

Application May 22, 1935, Serial No. 22,832
In Great Britain July 5, 1934

5 Claims. (Cl. 88—20)

This invention relates to ophthalmoscopes, and more particularly to hand ophthalmoscopes. It has for its object to provide an improved hand ophthalmoscope with the use of which the quality of the retinal image may be readily improved, especially by the elimination of the well known flare spot which is normally present in the field of view when instruments of the usual kind are employed. This flare spot which is generally known as corneal reflex is caused mainly by the light which is reflected from the glossy surfaces of the eye, particularly the front of the cornea, and although it can be reduced somewhat in size by making the light source as small as possible it cannot be entirely eliminated by adopting this expedient. The invention also removes or reduces the stray light and glint referred to as "retinal reflex".

In the hand ophthalmoscope of the invention, light to or from the eye of the patient is passed through a polarizing device, for example a Nicol prism so as to obtain the effects of plane polarization. It has been found that the use of polarized light in an ophthalmoscope enables the corneal reflex to be entirely cut out, since the light reflected by the glossy surfaces appears to be substantially unchanged through the reflection i. e. remains polarized, while the rays forming the image i. e. those passing from the retina to the eye of the observer are unpolarized, and consequently can be separated from the polarized light rays which would otherwise cause flare and haze. In the preferred arrangement a plane polarizer is included between the usual illuminating means and the patient's eye, while a second plane polarizer or analyzer is traversed by the light passing from the patient's eye to the eye of the observer. Suitable means are, of course, provided whereby one or both of the polarizers can be rotated on the optical axis for varying the plane of polarization.

The invention further provides in a ophthalmoscope or like instrument, means for polarizing the light used for illuminating the patient's eye prior to the entry of said light through the cornea, and analyzing means traversed by the beam of light passing from the patient's eye to the eye of the observer. Such an instrument may comprise in combination a source of light for producing an illuminating beam passing into the patient's eye, polarizing means traversed by said beam and analyzing means disposed between the patient's eye and the eye of the observer for intercepting light reflected from the surface of the cornea of the patient's eye. In an opthalmoscope in which the light from the source is deflected by a mirror before entering the patient's eye, the polarizing means can conveniently be interposed between the light source and the mirror, both the polarizing and analyzing prisms being, if desired, mounted so as to be capable of rotation about the optical axis. The invention also provides an ophthalmoscope comprising in combination a source of light, a condensing lens system, a mirror upon which the light source can be focussed by the condensing system, which mirror serves to direct the light into the patient's eye, a polarizing prism transmitting the light beam to the mirror, and an analyzing prism disposed behind the mirror for intercepting the polarized light or flare reflected from the patient's eye towards the observer.

The invention is illustrated in the accompanying drawing in which

Figure 1 is a diagram showing the optical arrangement of a hand ophthalmoscope provided with polarizing and analyzing means; Figure 2 is a side elevation of one construction of hand ophthalmoscope; and Figure 3 is a longitudinal section through the polarizer and related parts of Figure 2.

The light from a source 10 passes through a condensing system 11 and thence through a lens 12 which brings the beam to a focus substantially at a point 13 upon the usual ophthalmoscope mirror 14, said mirror being provided with a central aperture 15 in the usual way for permitting the patient's eye to be observed. The invention is not, of course, restricted to the use of centrally apertured mirrors 14. The mirror 14 may, for example, be constituted of one or more glass plates which, in addition to reflecting the illuminating beam into the eye, serve to transmit the image-producing beam. The beam of light is plane polarized however before meeting the mirror 14 by a Nicol prism 16, so that the beam 17 entering the iris 18 of the patient's eye indicated at 19 is also plane polarized and serves to illuminate the fundus 20.

The rays of light reflected by the fundus however are depolarized to a certain extent by the time they leave the front surface of the patient's cornea, and passing through the aperture 15, and if necessary through a lens 21, produce a virtual image in the observer's eye indicated at 22. An analyzing prism 23, is, however, positioned between the lens 21 and the observer's eye 22, and the angular disposition of this analyzer can be so adjusted relative to the angular position of the polarizer 16 that it intercepts any desired amount of the light having the original direction of polarization. This adjustment can, of course, be effected by rotating either the polarizer 16 or the analyzer 23, while in some cases it may be found desirable to provide a rotary adjustment on both analyzer and polarizer. The plane of polarization can thus be adjusted so that the mirror 14 brings about the least amount of deterioration in the illuminating light beam. If these two parts are placed in phase the ophthalmoscope works in the usual manner, any light reflected back from the patient's cornea passing through the analyzer 23 and thence producing flare in the eye 22 of the observer. By rotating the analyzer 23, however, to the required extent, this flare-producing reflected light which is, of course, still plane polarized, can be prevented from entering the observer's eye, the image being formed by the depolarized component of the light reflected from the fundus of the patient. A diaphragm or stop 24 serves to restrict the light beam passing through the lens 12 and polarizer 16.

The described optical system is substantially identical with that in the ordinary hand ophthalmoscope employed for direct visual observation, with the exception, of course, of the polarizer 16 and analyzer 23. A hand instrument employing polarized light in accordance with the invention can, therefore, be readily constructed on the usual lines, the lens 21 preferably forming one of a series of correction lenses similar to the usual practice. Stops may also be employed, as is customary.

A constructional embodiment of the invention is shown in Figure 2, in which a hollow handle 36 accommodates a dry battery (not shown) for illuminating an electric lamp bulb 37 forming the source of light. The condensing system 11 is capable of being focussed by means of a finger piece 38 carried on the usual stem 39 of the ophthalmoscope, while the lens 12 and diaphragm 24 are arranged in accordance with Figure 1. The polarizer 16 is mounted in a rotatable housing 41, and is capable of angular adjustment by movement of a lever 40, extending through a slot 42, while the analyzer 23 is also arranged for angular adjustment about its axis by twisting the marginal portion 41 of the analyzer mounting.

It will be appreciated that any suitable or known means may be employed for the production and analysis of the polarized light, suitable devices such as tourmaline, quartz, or glass or other reflectors being mentioned as examples.

The construction of the mirror which is normally employed in hand ophthalmoscopes requires some special consideration so as to reflect the polarized light with the maximum efficiency, and it is found that this can be increased by reducing the angle of incidence and reflection. Moreover, transparent glass reflectors have been found to be particularly effectual in reflecting polarized light, although the ordinary silvered glass, surface-silvered or polished metal types of mirror give satisfactory results when the plane of polarization of the illuminating beam is correctly adjusted.

With a view to bringing the eye of the observer into close proximity to the mirror and the patient's eye, it is desirable that the analyzer should be comparatively short measured along the viewing axis, thus giving a comparatively large viewing angle. Moreover, by arranging the usual ophthalmoscope mirror at the appropriate angle with regard to the axis of illumination so as to produce polarization at the reflecting surface, the use of a separate polarizer may be avoided, or alternatively the mirror can be utilized for augmenting the polarization of the light passing from the illuminant to the patient's eye.

What I claim is:

1. A hand ophthalmoscope comprising a handle, a light source carried by said handle, a stem extending upward from said handle and provided on one side of its upper end with a mirror support, a mirror carried by the support obliquely with respect to the axis of the rays from the light source so that it directs the light from the light source into the patient's eye, polarizing means between the light source and the mirror, a lens system for focusing the polarized light substantially upon the mirror, the mirror being constructed to permit the polarized light to travel from the patient's eye to the observer's eye, and analyzing means carried at the other side of the said upper end of the stem between the back of the mirror and the observer's eye for controlling the quantity of flare-producing polarized light entering the observer's eye, said analyzing means being disposed close to the mirror and next to the observer's eye for allowing a wide field of vision to be obtained, said analyzing means being comparatively short along the viewing axis in order that the observer's eye may be positioned in close proximity to the back of the mirror, the mirror support being relatively small in order that the patient's eye may be positioned at the front of the mirror in close proximity to the mirror and the observer's eye, the ophthalmoscope producing in the observer's eye an erect and magnified virtual image of the interior of the patient's eye, and the ophthalmoscope being very small and light in order that it may be held in the hand by the handle so as to be supported between the patient's eye and the observer's eye.

2. A hand ophthalmoscope comprising a handle, a light source carried by said handle, a stem extending upward from said handle and provided on one side of its upper end with a mirror support, a mirror carried by the support obliquely with respect to the axis of the rays from the light source so that it directs the light from the light source into the patient's eye, a condensing lens system between the light source and the mirror, polarizing means between the condensing system and the mirror, a lens system for focusing the polarized light substantially upon the mirror, the mirror being constructed to permit the polarized light to travel from the patient's eye to the observer's eye, and analyzing means carried at the other side of the said upper end of the stem between the back of the mirror and the observer's eye for controlling the quantity of flare-producing polarized light entering the observer's eye, said analyzing means being disposed close to the mirror and next to the observer's eye for allowing a wide field of vision to be obtained, the analyzing means being comparatively short along the viewing axis in order that the observer's eye may be positioned in close proximity to the back of the mirror, the mirror support being relatively small in order that the patient's eye may be positioned at the front of the mirror in close proximity to the mirror and the observer's eye, the ophthalmoscope producing in the observer's eye an erect and magnified virtual image of the interior of the patient's eye, and the ophthalmoscope being very small and light in order that it may be held in the hand by the handle so as to be supported between the patient's eye and the observer's eye.

3. A hand ophthalmoscope comprising a tubular handle, an electric battery in said handle, a light source carried by said handle, a condensing lens system capable of focusing movement towards and away from the light source, polarizing means in line with the condensing lens system for polarizing the light from the light source, a stem extending upward from said handle and provided on one side of its upper end with a mirror support, a mirror carried by the support disposed obliquely with regard to the condensing lens system so as to reflect the polarized light into the eye of the patient, the mirror being constructed to permit the polarized light to travel from the patient's eye to the observer's eye, a lens system for focusing the polarized light substantially upon the mirror, and analyzing means carried at the other side of the said upper end of the stem between the back of the mirror and the observer's eye, with which said analyzing means is contiguous, for controlling the quantity of flare-producing polarized light entering the observer's eye, said analyzing means being disposed close to the mirror and next to the observer's eye for allowing a wide field of vision to be obtained, the analyzing means being comparatively short along the viewing axis in order that the observer's eye may be positioned in close proximity to the back of the mirror, the mirror support being relatively small in order that the patient's eye may be positioned at the front of the mirror in close proximity to the mirror and the observer's eye, the ophthalmoscope producing in the observer's eye an erect and magnified virtual image of the interior of the patient's eye, and the ophthalmoscope being very small and light in order that it may be held in the hand by the handle so as to be supported between the patient's eye and the observer's eye.

4. A hand ophthalmoscope as set forth in claim 2 provided with means for rotating the polarizing means about its axis.

5. A hand ophthalmoscope comprising a handle, an electric bulb supported thereby, a condensing lens system collecting light from the bulb, a polarizing prism disposed in the beam emerging from the condenser, means for rotating the polarizer about its axis, a stem extending upward from said handle and provided on one side of its upper end with a mirror support, a mirror carried by the support obliquely disposed in the beam of light passing from the polarizer, a lens system for focusing the polarized light substantially upon the mirror, the mirror being constructed to permit the polarized light to travel from the patient's eye to the observer's eye, an analyzing prism carried at the other side of the said upper end of the stem in front of and close to the mirror, and means for rotating the analyzer about its axis, the analyzer being comparatively short along the viewing axis in order that the observer's eye may be positioned in close proximity to the mirror on one side of the mirror, the mirror support being relatively small in order that a patient's eye may be positioned on the said other side of the mirror in close proximity to the mirror and the observer's eye, the ophthalmoscope producing in the observer's eye an erect and magnified virtual image of the interior of the patient's eye, and the ophthalmoscope being very small and light in order that it may be held in the hand by the handle so as to be supported between the patient's eye and the observer's eye.

CHARLES HENRY KEELER.